US006667840B1

(12) United States Patent
Cheong et al.

(10) Patent No.: US 6,667,840 B1
(45) Date of Patent: Dec. 23, 2003

(54) METHOD FOR SCREENING OSCILLATORY PES WITH 1.7 KHZ HARMONIC RESONANCE

(75) Inventors: Kok Hiang Cheong, Singapore (SG); Kian Keong Ooi, Singapore (SG); Wing Kong Chiang, Singapore (SG); Ricky Wei Watt Yeo, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/556,885

(22) Filed: Apr. 19, 2000

Related U.S. Application Data
(60) Provisional application No. 60/130,279, filed on Apr. 21, 1999.

(51) Int. Cl.⁷ ............................................. G11B 5/596
(52) U.S. Cl. ..................... 360/31; 360/77.02; 360/77.04
(58) Field of Search ............................... 360/31, 77.01, 360/77.02, 78.01, 78.04, 77.04

(56) References Cited

U.S. PATENT DOCUMENTS 5,940,240 A * 8/1999 Kupferman .............. 360/77.02
6,049,441 A * 4/2000 Ottesen ................... 360/77.04
6,310,742 B1 * 10/2001 Nazarian et al. ......... 360/77.04
2002/0034038 A1 * 3/2002 Ahn ........................ 360/77.04

* cited by examiner

Primary Examiner—David Hudspeth
Assistant Examiner—Varsha A. Kapadla
(74) Attorney, Agent, or Firm—Mitchell K. McCarthy (57) ABSTRACT

The present invention provides a method to screen tracks on a magnetic disc in a disc drive for harmonic resonance. There are several algorithms in the method performing different functions at various stages of the method. At any point in time, only one track is subjected to test by the method. The first stage of the method has one algorithm performing the function of obtaining a summation of all the absolute Position Error Signal (PES) velocities on a single track. Another algorithm performs the function of obtaining the average PES velocity with the summation of the absolute PES velocities. At the subsequent stage, another algorithm performs the function of obtaining the average PES velocity of a number of revolutions. An algorithm at the final stage performs the function of comparing the average PES velocity to a preset standard criterion, which is determined empirically in a separate algorithm. The track would be failed if the average PES velocity exceeds the preset standard criterion value.

17 Claims, 11 Drawing Sheets

METHOD FOR SCREENING OSCILLATORY PES WITH 1.7 KHZ HARMONIC RESONANCE

This patent application claims priority from the U.S. Provisional Application No. 60/130, 279, filed on Apr. $21^{st}$ 1999.

FIELD OF INVENTION

The present invention relates generally to the PES (Position Error Signal) Certification Test for defects of servo bursts in a disc drive. More particularly, the present invention relates to a method of screening oscillatory PES with 1.7 kHz harmonic during the PES Test.

BACKGROUND OF THE INVENTION

Figure 8:
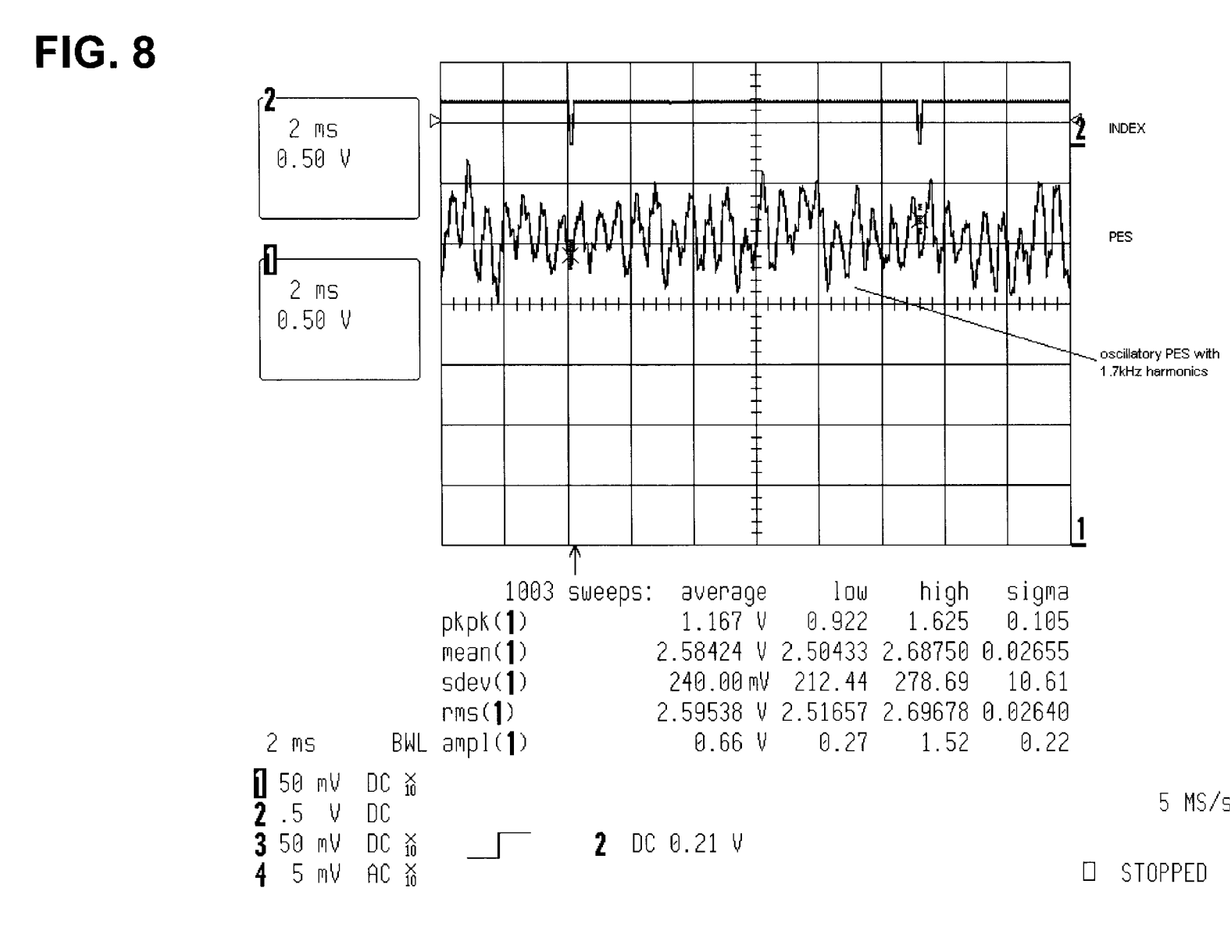
FIG. 8 shows a table of the waveform of PES of a track with 1.7 kHz harmonic against time.
Figure 9:
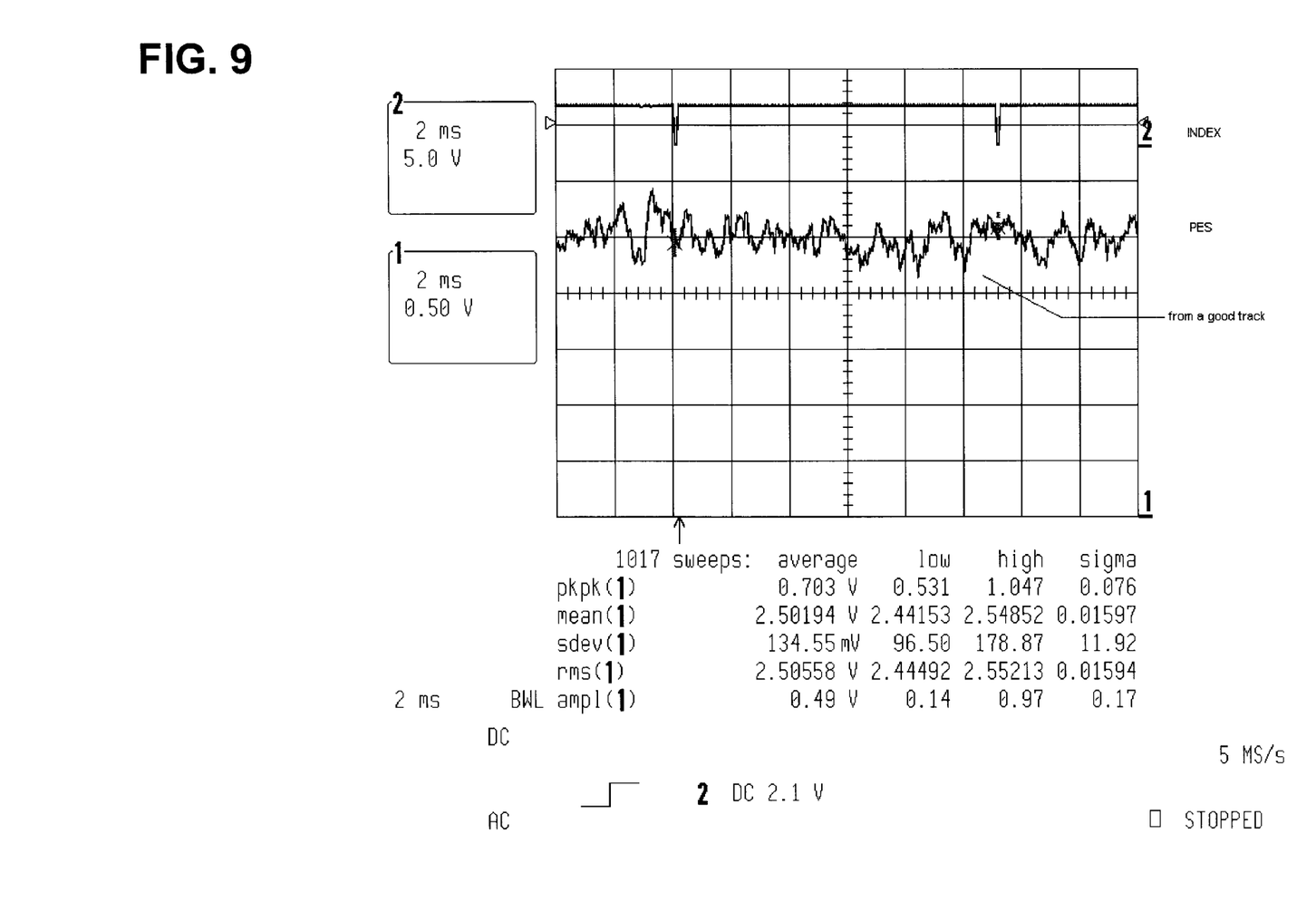
FIG. 9 shows a table of the waveform of PES of a good track against time.
Figure 10:
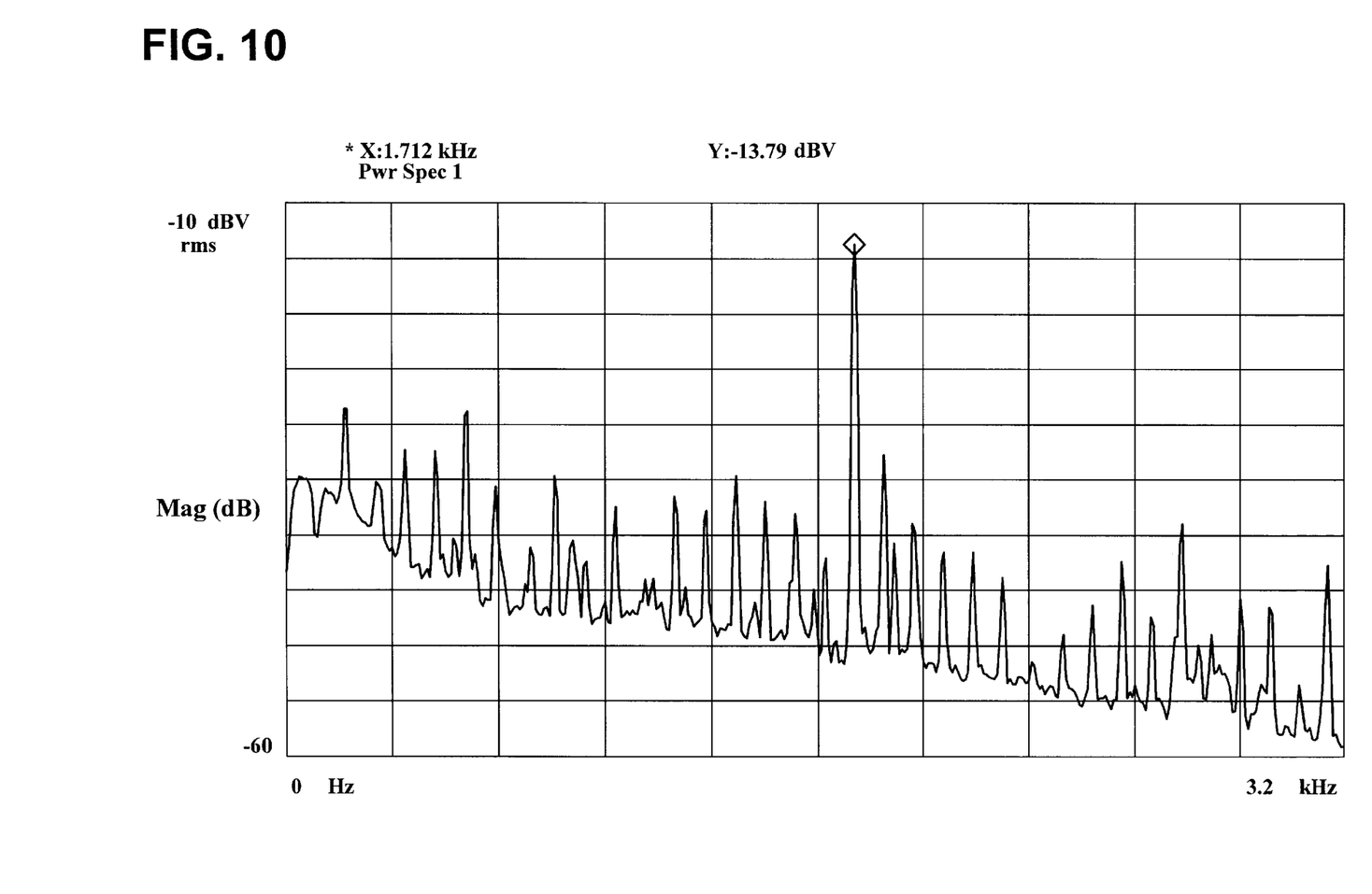
FIG. 10 shows a table of the PES spectrum of a track with 1.7 kHz harmonics.
Figure 11:
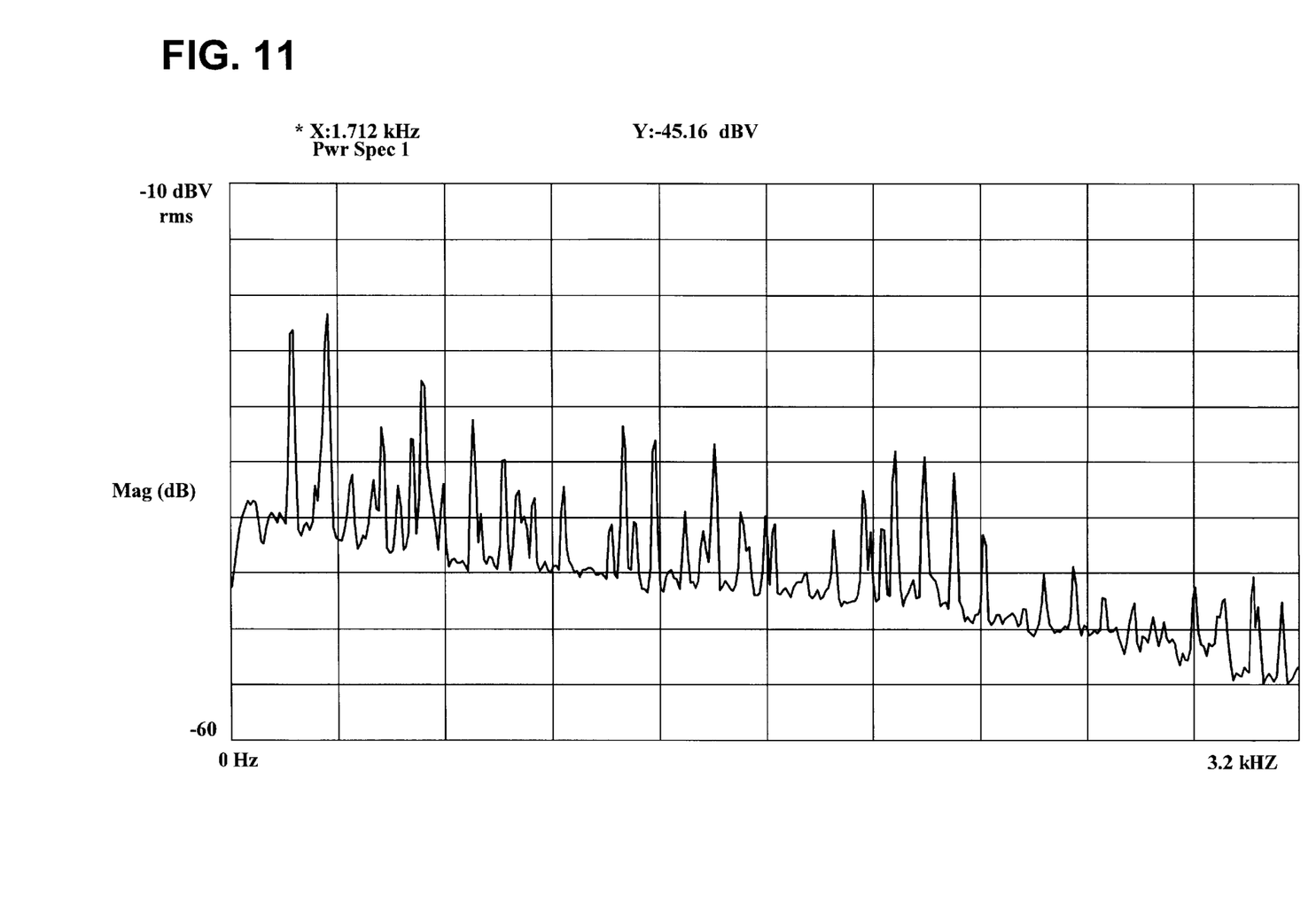
FIG. 11 shows a table of the PES spectrum of a good track.

The present test used for screening out bad tracks in a disc drive is the PES (Position Error Signal) Test. In the PES Test, every data track is scanned and tested for any servo defect. During the test, any defects concerning the servo will be reported and appropriate action will be taken by the algorithm. Depending on the type of servo error, action taken can be either zapping the defective burst or skipping the track containing the defect. Therefore, it is important that all servo defects must be detected before the Defect Scan Test is performed. In the Defect Scan Test, the read and write operations are performed, where the position is dependent on the PES data. However, there is the presence of a 1.7 kHz NRRO (Non-Repeatable Run Out) harmonic resonance due to windage excitation of the suspension at the area of the head assembly on the actuator arm. This has been proven by drive level LDV (Laser Doppler Vibrometer) analysis and from which it has shown that the HGA (Head Gimbal Assembly) have similar vertical motion, but bad HGAs transmit more of this vertical motion into off track motion. And, the focus on preventing windage excitation on the sensitive pre-load bend region of the actuator arm with wind diffusion wedge, damper and load beam can show that 1.7 kHz resonance on the PES can be greatly reduced. However, there is a need for screening the 1.7 kHz harmonic when performing PES Test due to the reason that windage excitation is possible and all servo tracks must be ensured good for read and write operations during Defect Scan Test. This is because the windage excitation can happen at the time of servo-writing whereby the servo pattern is written onto each platter of the HDA (Head Disc Assembly). When this happens, the 1.7 kHz resonance will be embedded and written in the servo pattern. Hence, in such a way, the 1.7 kHz resonance has resulted to be RRO (Repeatable-Run Out) problem as it is already inherent as a write-in. The PES test is based on the amplitude change of the PES of a servo burst from its on-track value, if the amplitude change exceeds the PES threshold criterion value, that particular servo burst would be considered as a bad servo and will be zapped. According to this testing criterion, as long as the PES has not made any huge jump in amplitude away from the on-track value, (i.e., the head is not too far away from the on-track position), it is said that the PES will be considered good enough for any read and write operation. However, the current PES Test algorithm, shows that there are drives that have passed the PES Test but failed the Defect Scan Test with servo off-track error code. This is because the drive code setting criterion is dependent on the position and velocity error code. For this particular case, the 1.7 kHz resonance will definitely have higher velocity error. As a result, it is clear that the method testing for PES threshold will not be sufficient in PES Test. In FIG. 8, FIG. 9, FIG. 10 and FIG. 11, the PES measurement obtained from tracks with and without 1.7 kHz harmonic for the above explanation is shown. FIG. 8 and FIG. 9 depicts waveform of oscillatory PES with 1.7 kHz harmonic along with that from a good track. The PES spectrums in FIG. 10 and FIG. 11 show the difference in amplitude of the PES between a good track and a track with inherent 1.7 kHz harmonic. It is observed that the amplitude of the 1.7 kHz harmonic is 1.167 Vpp (Peak to Peak Voltage) (7.78%) while the amplitude of the good track is 0.703Vpp (4.68%). The CSPT (Certificate Sequence Parameter Table) criterion for PES threshold is 9%. Therefore, the track can still pass the PES Test and it can be that PES threshold testing is not sufficient for screening any track containing 1.7 kHz resonance.

There remains a need for an improved method for scanning tracks that are defective due to the presence of high frequency harmonics. It will be evident from the following description that the present invention offers this and other advantages

SUMMARY OF THE INVENTION

The present invention proposes a new algorithm to be added to the existing mechanism in detecting bad tracks that contain 1.7 kHz (Repeatable-Run Out) RRO resulting from written-in PES oscillatory and thus, allowing PES Test to screen-out these tracks.

According to one aspect of the invention, there is provided a method for screening tracks on a magnetic disc in a disc drive using Position Error Signal (PES) velocity to determine the presence of high frequency PES component, the method which include the algorithms to obtain a summation of all absolute PES velocities on a single track in a revolution. The method also include an algoriothm to obtain an average PES velocity using the summation of all absolute PES velocities for a single revolution. Another algorithm provided by the method is to obtain an average PES velocity for a multiple number of revolutions of the track using the average PES velocity for each revolution and compare this average PES velocity with a pre-set standard criterion value.

Another aspect of the present invention provides for the algorithms to be repeated with the number of revolutions varied.

Another aspect of the present invention enables the standard criterion value to be pre-determined empirically.

The method in the present invention can magnify the accumulated value, which enables a good track to be differentiated from a track with 1.7 kHz resonance.

The present invention also can be implemented in a disc drive as a program for a computer system to perform a method for screening PES velocity to determine the presence of high frequency PES component.

These and various other features as well as advantages which characterize the present invention will be apparent upon reading of the following detailed description and review of the associated drawings.

DETAILED DESCRIPTION

The most preferred embodiment of the present invention is described below.

Figure 1:
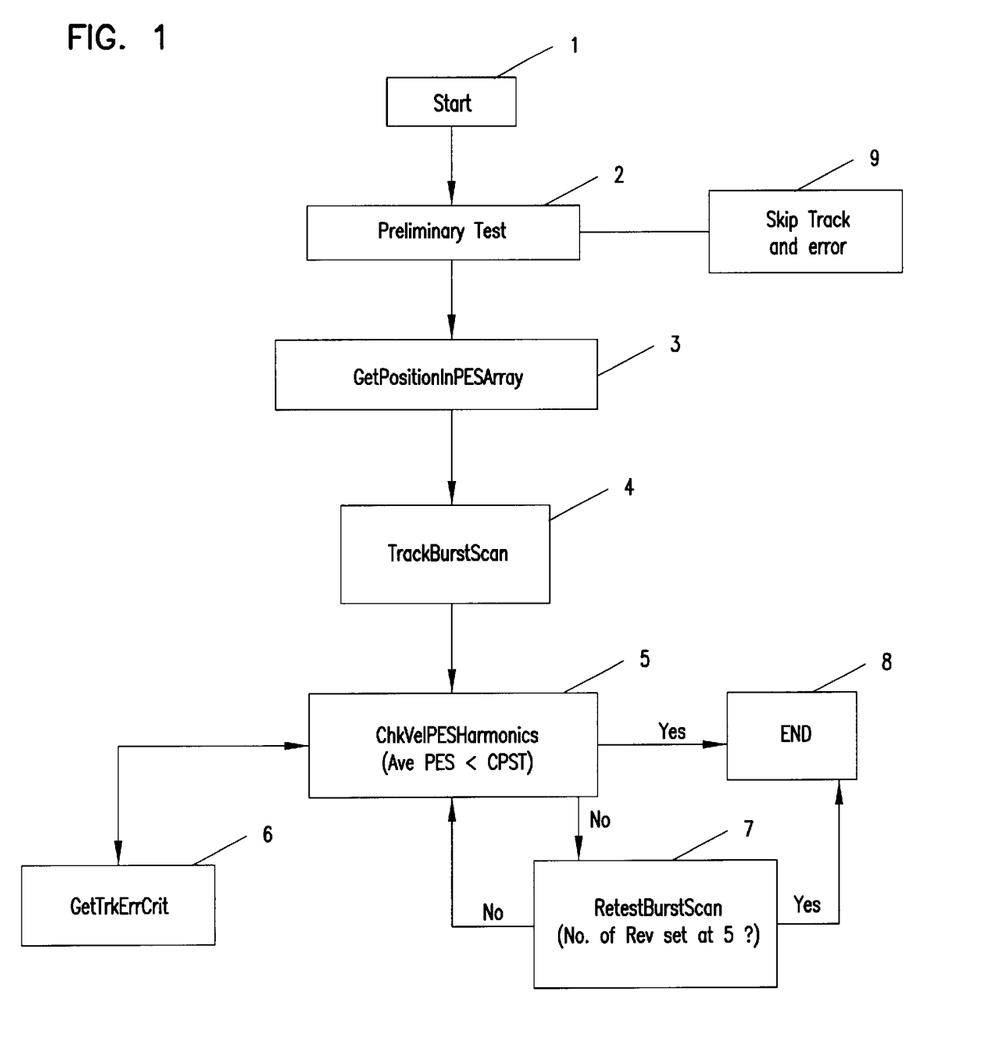
FIG. 1 is a block diagram of the algorithm of the present invention.

A system for screening tracks with 1.7 kHz harmonic resonance is illustrated in FIG. 1. The system includes a Preliminary Test (2) and the subroutines GetPositionInPESArray (3), TrackBurstScan (4), ChkVelPESHarmonics (5), GetTrkErrCrit (6) and RetestBurstScan (7). The relationship between each subroutine is illustrated in FIG. 1.

As each servo burst passes the HGA, the Preliminary Test (2) would first screen the particular servo burst of errors, then the PES velocity, or the PES gradient between successive servo bursts, is read and the absolute PES velocity between two consecutive servo burst is calculated and accumulated in the GETPositionInPESArray (3) subroutine. The subroutine TrackBurstScan (4) calls on the subroutine GetPositionInPESArray (3) to obtain the accumulated absolute PES velocity, which is further manipulated to obtain the average PES velocity for two revolutions of the same track. The subroutine, ChkVelPESHarmonics (5), is then called upon to compare the average PES velocity with a standardized (Certificate Sequence Parameters Table) CSPT criterion to evaluate if the track has passes the test. The CSPT criterion is obtained in the subroutine, GetTrkErrCrit (6). If the track did not pass the test, the subroutine RestestBurstScan (7) is then called to perform another round of test similar to that in the subroutine TrackBurstScan (4) with two differences. The details of each of these subroutines are further explained below.

In the Preliminary Test (2), a track would be tested for servo error like Bad Grey Code, Off-Track and Missed Address Mark Error before the accumulation of the PES velocity. If any of these errors occurred, the PES velocity at that particular burst will not be accumulated in the subroutine, GetPositionInPESArray (3).

Figure 2:
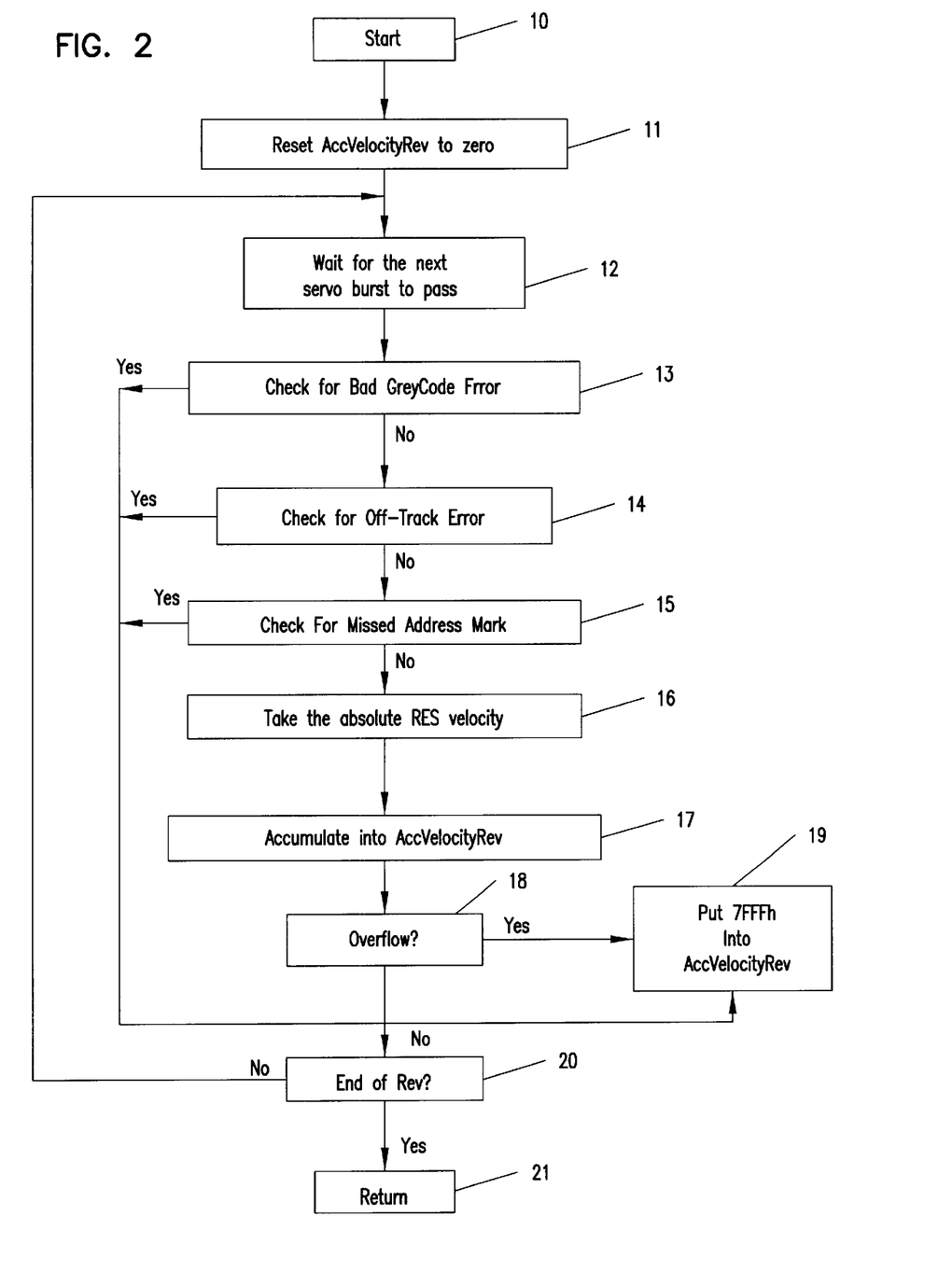
FIG. 2 is a block diagram of one of the subroutines in FIG. 1, which enables the calculation of the accumulated Position Error Signal (PES) velocity.

Following the Preliminary Test (2), GetPositionInPESArray (3), would be initialized to accumulate the absolute value of PES velocity at each servo burst on that track in one revolution. The accumulated value is stored in a variable, AccVelocityRev. While in the process of accumulation, if there is any overflow occurred, the variable AccVelocityRev will be stored with maximum value (7FFFh) which will be greater than the standard CSPT criterion and therefore, this track will eventually be skipped. FIG. 2 illustrates both the Preliminary Test (2) and the GetPositionInPESArray (3) subroutine. At the passing of each servo burst of a particular track during a single revolution of the magnetic disc, the Preliminary Test is executed in the sequence for Bad Grey Code (13), Off-Track Error (14) and Missed Address Mark Error (15). The remaining algorithm would be skipped once any one of these test results is positive. If all these test results were negative, the absolute PES velocity would then be calculated (16) and accumulated (17) in the variable AccVelocityRev. After each addition of the absolute PES velocity in the variable, there would be a check for overflow (18). If there is an overflow, the maximum value of (7FFFh) is stored (19) in the variable AccVelocityRev. If there is no overflow, the next step is a check on whether the revolution is completed (20). This algorithm will be repeated until a single revolution is completed (21).

Figure 3:
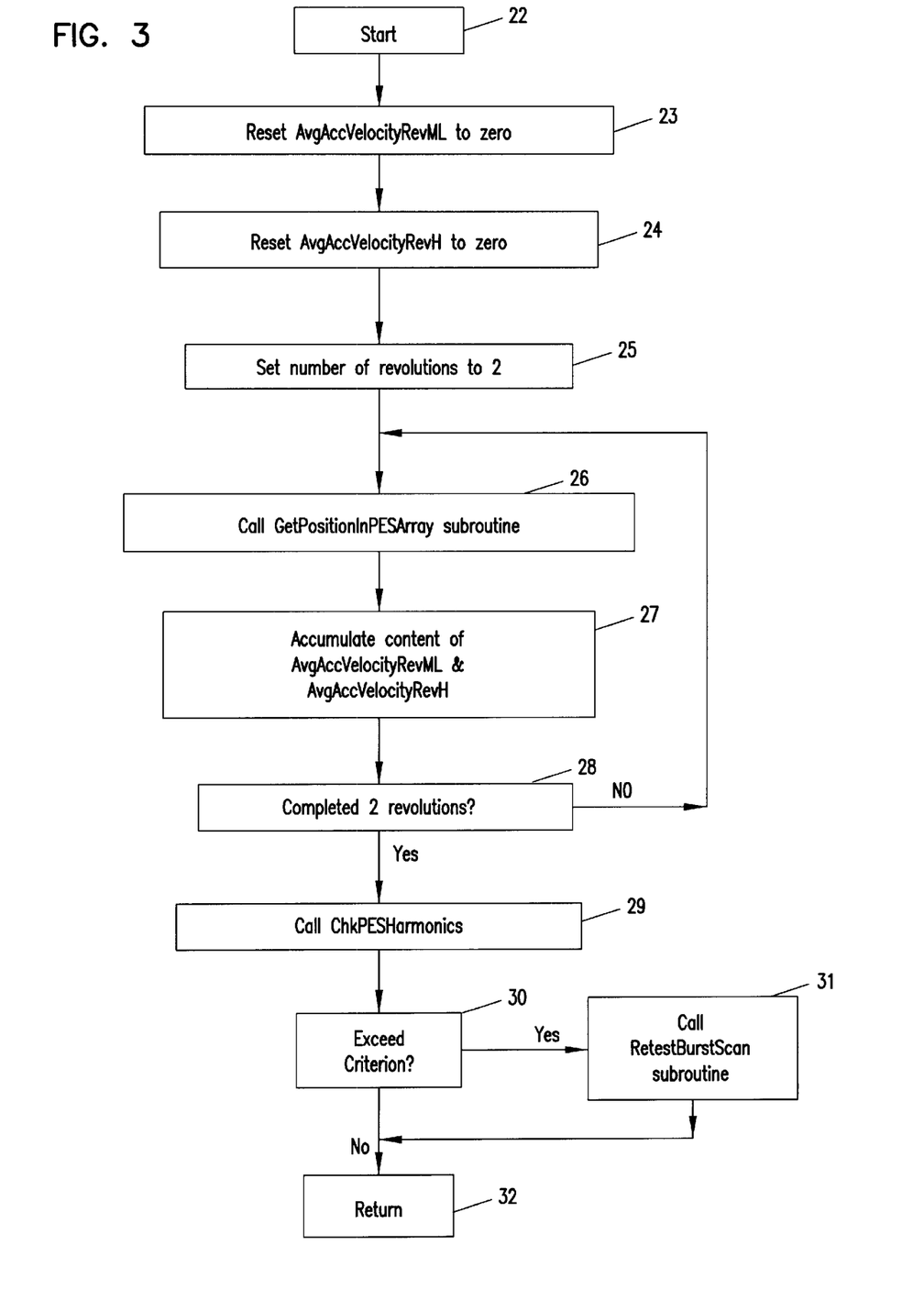
FIG. 3 is a block diagram of another subroutine in FIG. 1, which enables the calculation of the average PES velocity for two revolutions.

In FIG. 3, the subroutine, TrackBurstScan (4) is illustrated. In this subroutine, there are two registers, AvgAccVelocityRevML and AvgAccVelocityRevH. These two registers are used to store the accumulation of the content of the AccVelocityRev. The two registers are reset to zero at the start of the algorithm in step (23) and (24) and the number of revolutions is set at 2 in step (25). At each revolution, the subroutine GetPositonInPESArray is called in step (26) and the content of AccVelocityRev is added on the registers AvgAccVelocityRevML and AvgAccVelocityRevH for each revolution. The step (28) in this subroutine will check for the completion of the number of revolutions made. The steps (26), (27) and (28) are repeated until the total number of completed revolutions is 2. When the data accumulation for two revolutions is completed, the subroutine ChkVelPESHarmonics is called in step (29) to calculate average PES velocity for the two revolutions with the average values in the two registers. This resultant value is then compared with the CSPT criterion in the same step (29). When the resultant is determined in step (30) and if the value is greater than the CSPT criterion, the subroutine RetestBurstScan will be called in step (31) to re-test the track.

Figure 4:
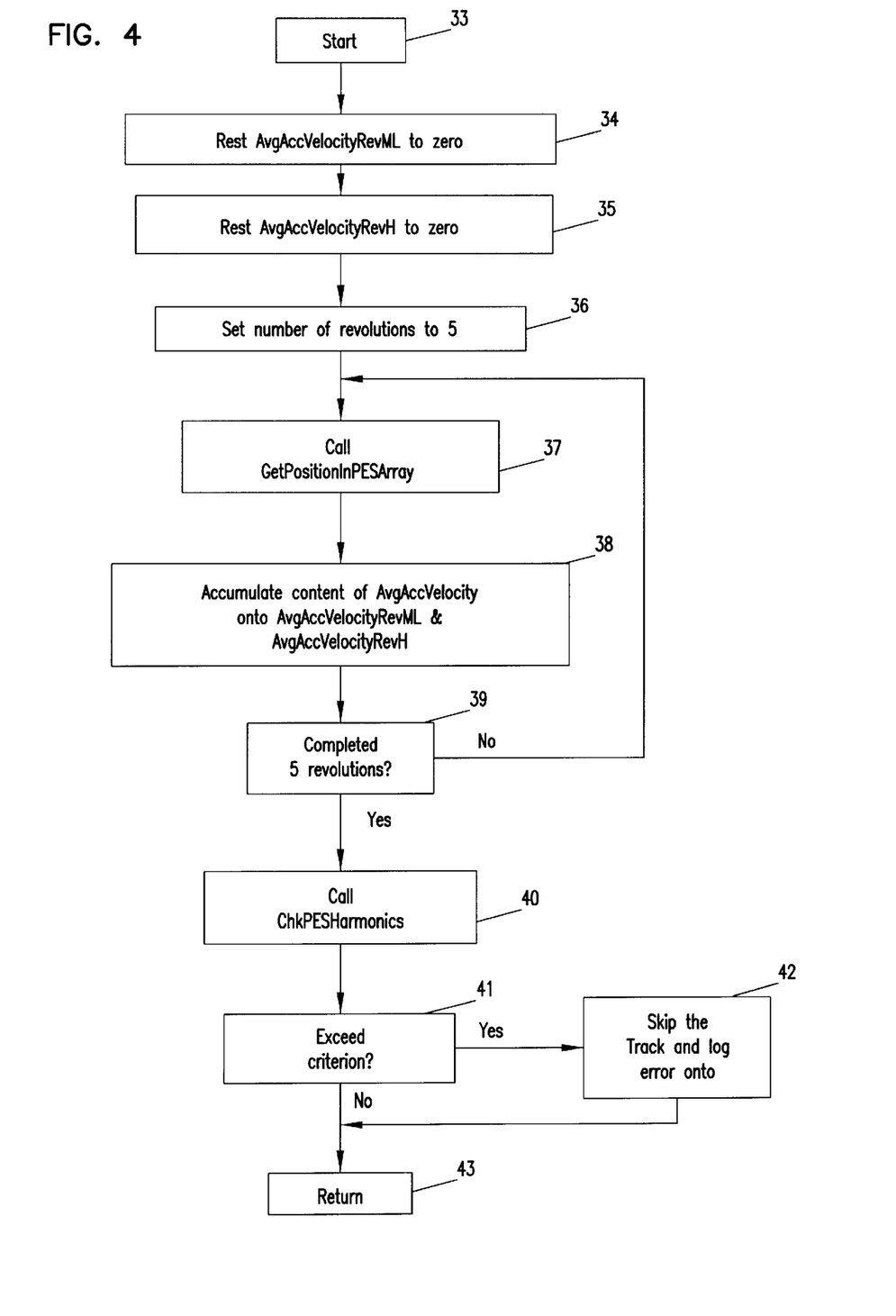
FIG. 4 is a block diagram of another subroutine in FIG. 1 of the present invention, which shows the calculation of the accumulated average PES for multiple revolutions.

FIG. 4 illustrates the subroutine RetestBurstScan, which is similar to the subroutine, TrackBurstScan, illustrated in FIG. 3 described above except for two main differences. One of the difference is that there are more revolutions for the accumulation of data in this subroutine and this is specified in the CSPT criterion. The number of revolutions is set at 5 in step (36). In this subroutine, the registers AvgAccVelocityRevML and AvgAccVelocityRevH are used for storing accumulated PES velocity and average accumulated PES velocity calculation in step (38). The other difference is that if the average accumulated PES velocity has exceeded the criterion from the ChkVelPESHarmoincs, the track will be skipped and the error will be logged in step (42). The steps: (34), (35), (37), (39), (40) and (41) are similar to the corresponding steps: (23), (24), (26), (28), (29) and (30) in FIG. 3.

Figure 5:
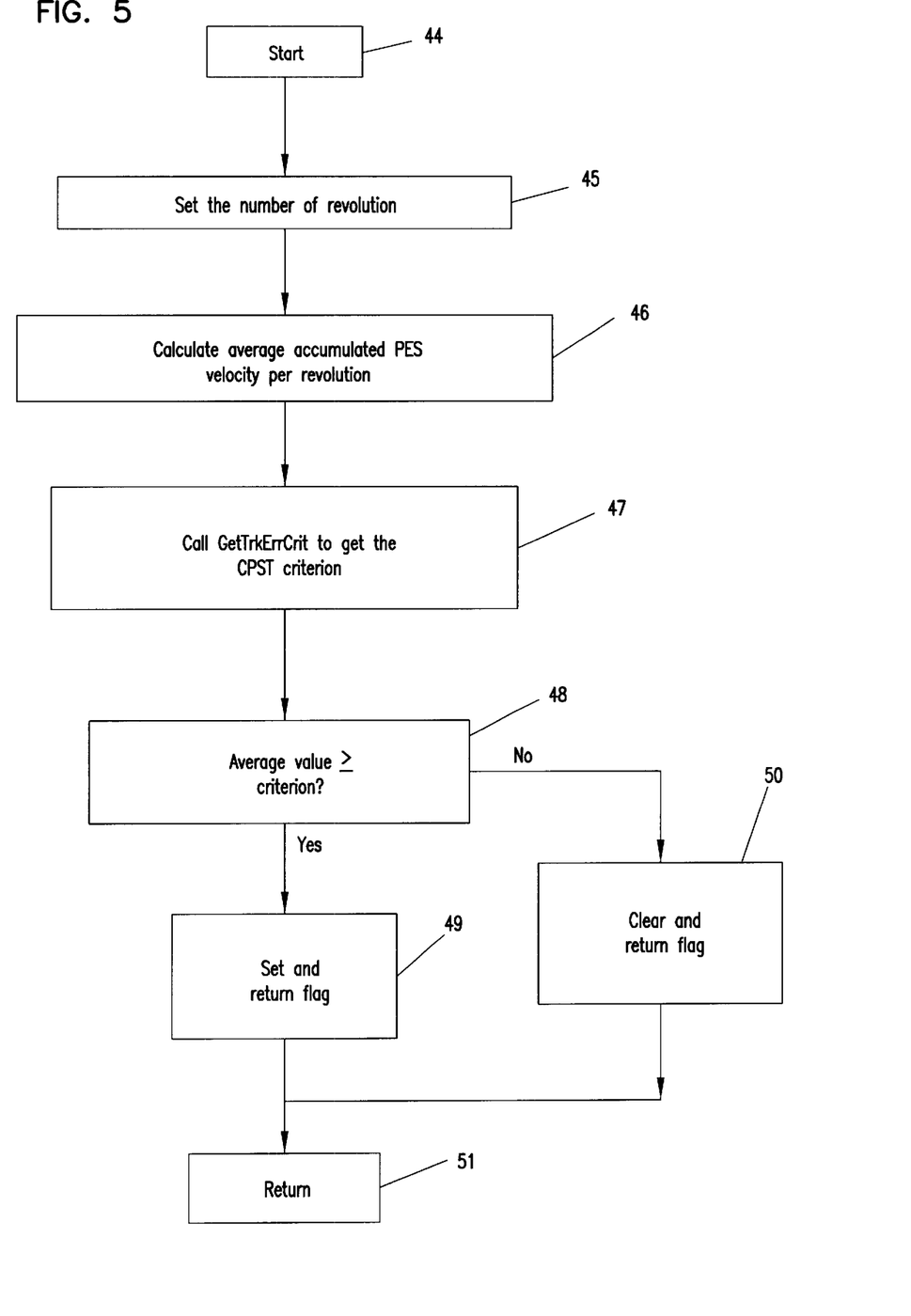
FIG. 5 is a block diagram of another subroutine in FIG. 1 of the present invention, which shows the calculation and comparison of the average PES velocity with a standard criterion.

In FIG. 5, the subroutine ChkVelPESHarmoincs (5) illustrates the comparison of the calculated average PES velocity and the CSPT criterion. The number of revolutions is set in step (45) and the average accumulated PES velocity per revolution is calculated in step (46). The CSPT criterion is obtained from the subroutine GetTrkErrCrit (6) in step (47). The resultant obtained in step (46) is then compared to the CSPT criterion in step (48). If the calculated average PES velocity is greater than the CSPT criterion, then the particular track that is tested will be logged with an error value and skipped as in step (49). If the resultant is less than the CSPT criterion, the track will be cleared for use as in step (50).

Figure 6:
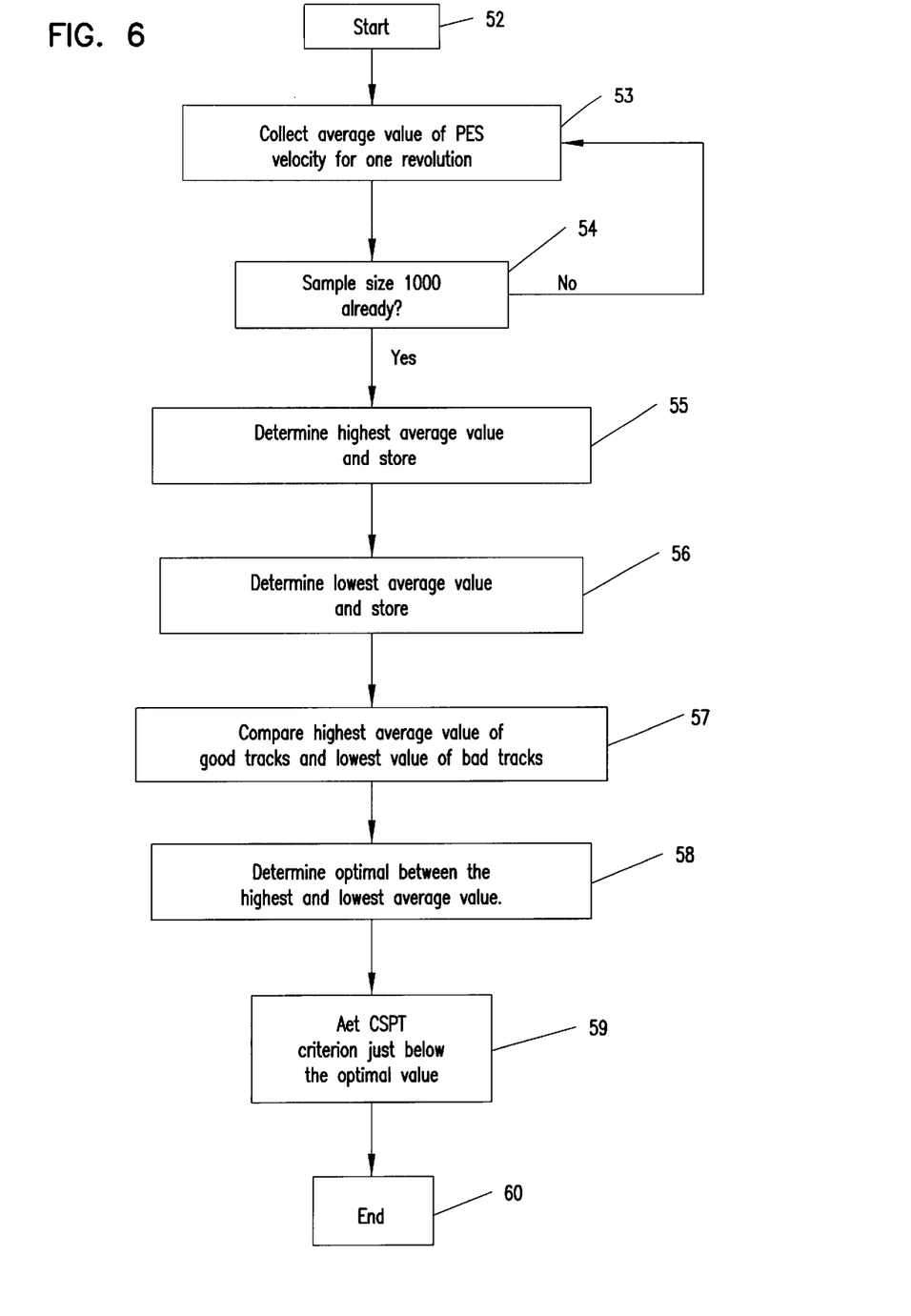
FIG. 6 is a block diagram of another subroutine in FIG. 1, which shows the algorithm of obtaining the standard criterion.
Figure 7:
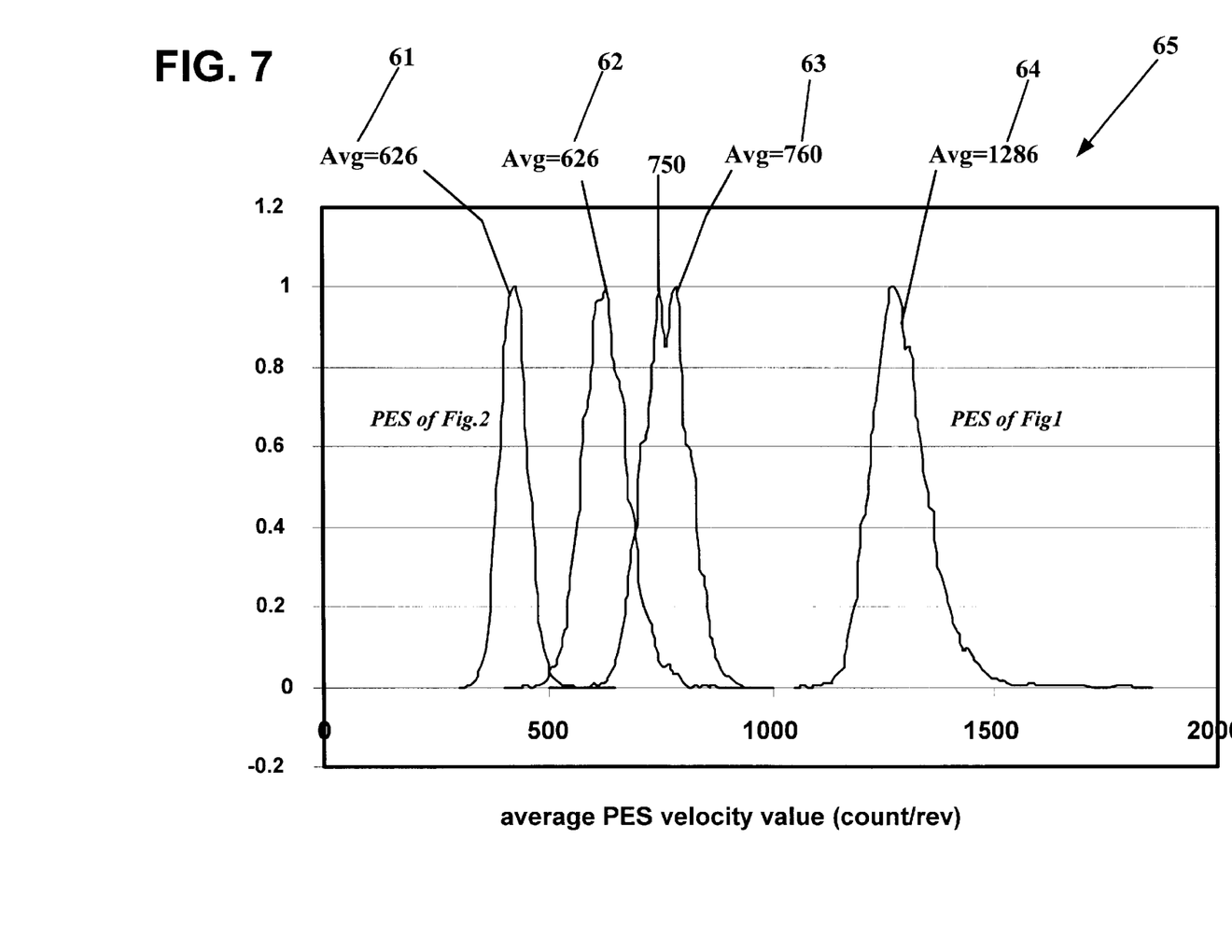
FIG. 7 shows a histogram of the average PES velocities of tracks with and without harmonic resonance.

FIG. 6 illustrates how the CSPT criterion is determined in the GetTrkErrCrit (6) subroutine. This is done empirically where several tracks with and without 1.7 kHz resonance are examined. The average value of the accumulated PES velocity over one revolution is observed for over 1000 samples. This is done in step (53) and (54). In step (55), (56) and (57), when the sample size has reached 1000, the accumulated values are then studied to determine the optimal value. FIG. 7 is an example to illustrate the use of this empirical method. There are two good tracks and two tracks with 1.7 kHz harmonic resonance in this example, where one of the 1.7 kHz tracks is of the worst case studied so far. The average values of PES velocities of these tracks are accumulated according to step (53) and (54). These values are then plotted as a chart. From the chart in FIG. 7, the highest value (62) of 626 (count per revolution) and the lowest (61) of 378 (count per revolution) of the two good tracks are determined. From the same chart, the lowest average PES velocity (63) of 760 (count per revolution) and the highest average PES velocity (64) of 1286 (count per revolution) of the two 1.7 kHz tracks, is also determined. Based on these values, the optimal value is set at (65) 750 as in step (58). The optimal value is set based on the ideal that no good tracks would be screened out while all tracks with 1.7 kHz harmonic resonance are screened out. The highest possible average PES velocity of the good track is found to be much lower than the lowest possible average PES velocity of the track with 1.7 kHz harmonic resonance. Therefore the optimal value is set between these two values such that the average PES velocity values of good tracks would be lower than the optimal value while the average PES velocity values of tracks with 1.7 kHz would be higher than the optimal value. In step (59), the CSPT criterion is set just below the optimal value (65) of 750 (count per revolution), which is above the highest average value detected in good tracks and lower than the lowest average value detected in bad tracks. This would ensure that it is sufficiently low to capture the bad tracks but not too low to screen out the good tracks.

The foregoing description is only illustrative of various embodiments of the invention, and a person skilled in the art will understand that changes can be made to the details of structure, function and processes without going beyond the scope of the present invention.

What is claimed is:

1. A method for screening tracks on a magnetic disc in a disc drive using Position Error Signal (PES) velocity to determine the presence of high frequency PES component, the method comprising steps of:
   (a) obtaining a summation of all absolute PES velocities on a single track in a revolution;
   (b) obtaining an average PES velocity from the summation obtained in step (a);
   (c) obtaining an average PES velocity for a multiple number of revolutions of the track by repeating step (b); and
   (d) comparing the average PES velocity obtained in step (c) with a pre-set standard criterion value.

2. The method of claim 1, wherein step (a) comprises steps of:
   (a)(i) obtaining an absolute PES velocity between two consecutive servo burst on the track in the magnetic disc; and
   (a)(ii) adding together the absolute PES velocities obtained in step (a)(i) for each pair of consecutive servo burst on the track to obtain the summation of the absolute PES velocities.

3. The method of claim 1, wherein step (b) comprises a step of dividing the summation of all the absolute PES velocities by the total number of servo burst on the track.

4. The method of claim 1, wherein step (c) comprises steps of:
   (c)(i) setting the number of revolutions for the track to turn;
   (c)(ii) storing the average PES velocity of a track obtained in a single revolution; and
   (c)(iii) adding on to the average PES velocity stored in (c)(ii) for each revolution of the track.

5. The method of claim 1, wherein step (d) comprises steps of:
   (d)(i) setting the standard criterion value;
   (d)(ii) comparing the average PES velocity obtained in step (c) with the standard criterion value in step (d)(i) to determine if the average PES velocity is larger than or equal to the standard criterion value; and
   (d)(iii) setting the test track to be skipped if the average PES velocity is greater than the standard criterion value.

6. The method of claim 1 further comprising a step (g) of repeating all steps (a) to (d) for an increased number of revolutions, when the average PES velocity for 2 revolutions exceeds the standard criterion value.

7. The method of claim 6, wherein the number of revolutions is predetermined.

8. The method of claim 5, wherein the standard criterion value is determined empirically.

9. A disc drive configured with a program of instructions executable by a computer system to perform a method for screening PES (Position Error Signal) velocity to determine the presence of high frequency PES component, the disc drive comprising:
   a first device configured for obtaining a summation of all absolute PES velocities on a single track in a revolution;
   a second device configured for obtaining an average PES velocity from the summation obtained in the first device;
   a third device configured for obtaining an average PES velocity for a multiple number of revolutions of the track from an output of the average PES velocities provided by the second device; and
   a comparator configured to compare the average PES velocity provided by the third device with a pre-set standard criterion value.

10. A disc drive of claim 9, wherein the first device comprises:
   a first component for obtaining an absolute PES velocity between two consecutive servo burst on a track in a magnetic disc; and
   a second component for adding together the absolute PES velocities obtained in the first component for each pair of consecutive servo burst on a track to obtain the summation of the absolute PES velocities.

11. The disc drive of claim 9, wherein the second device comprises a third component for dividing the summation of all the absolute PES velocities by the total number of servo burst on the track.

12. The disc drive of claim 9, wherein the third device comprises:
   a fourth component for setting the number of revolutions for a track to turn;
   a fifth device for storing the average PES velocity of a track obtained in a single revolution; and
   a sixth device for adding on to the average PES velocity stored the fifth device for each revolution of the track.

13. The disc drive of claim 9, wherein the comparator comprises:

a first means for setting the standard criterion value;

a second means for comparing the average PES velocity obtained in the third device with the standard criterion in the fifth component to determine if the average PES velocity is larger than or equal to the standard criterion; and a third means for setting the test track to be skipped if the average PES velocity is greater than the standard criterion.

14. The disc drive of claim 9, wherein the average PES velocity for 2 revolutions exceeds the standard criterion, further comprises a fourth device for initializing the repeat of all the devices in claim 9 for an increased number of revolutions.

15. The disc drive of claim 9, wherein the number of revolutions is predetermined.

16. The disc drive of claim 9, wherein the standard criterion is determined empirically.

17. A disc drive comprising at least one magnetic disc with at least one track; and means for screening out disc repeatable runout from high frequency resonance as indicated by an average position error signal velocity greater than a preselected threshold on the at least one track.

* * * * *